A. E. CHAMBERLAIN & J. B. CROWLEY.

Pipe-Elbows.

No. 131,499.

Patented Sep. 24, 1872.

Attest

Inventors

UNITED STATES PATENT OFFICE.

ADDIS E. CHAMBERLAIN AND JOHN B. CROWLEY, OF CINCINNATI, OHIO, ASSIGNORS TO CHAMBERLAIN & CO., OF SAME PLACE.

IMPROVEMENT IN PIPE-ELBOWS.

Specification forming part of Letters Patent No. 131,499, dated September 24, 1872.

*To all whom it may concern:*

Be it known that we, ADDIS E. CHAMBERLAIN and JOHN B. CROWLEY, of Cincinnati, in the county of Hamilton and State of Ohio, have invented a certain new and useful Improvement in Pipe-Elbows, of which the following is a specification:

Our joint invention consists of a convertible pipe-elbow of peculiar construction, the sections of which are connected by and revolve on an axis placed in the center of their plane of intersection, and at right angles thereto, whereby a ready adjustment of the elbow is attainable, without severing the sections thereof or detaching it from its connections.

Figure 1:
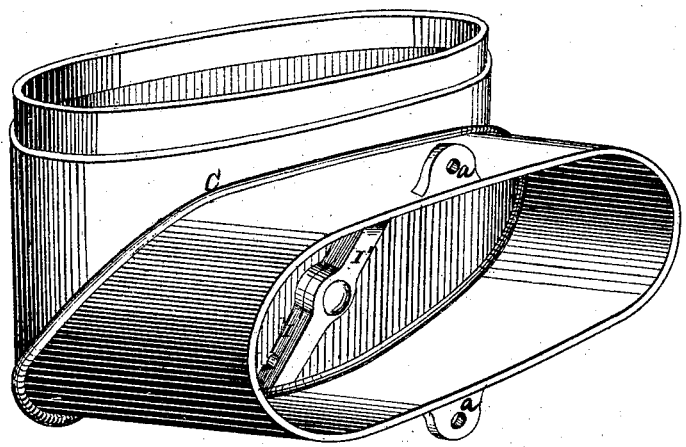
Figure 2:
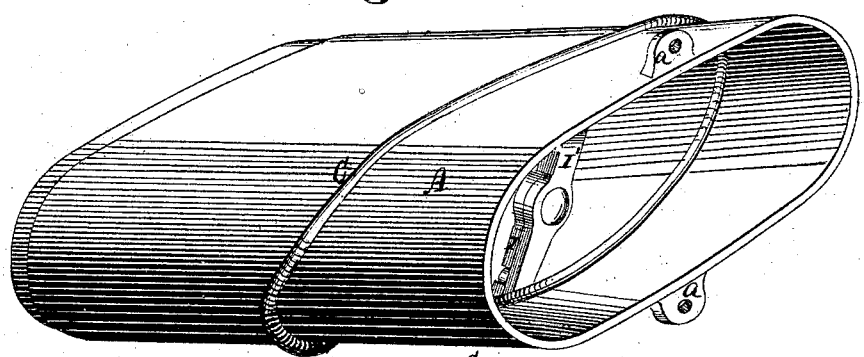
Figure 3:
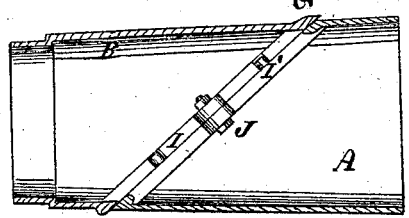

In the accompanying drawing, Figure 1 is a perspective view of the elbow as constructed to fit over the pipe-flange of a stove, its sections being at right angles to connect with a vertical or horizontal pipe. Fig. 2 is a perspective view thereof, the sections being so adjusted as to lie in one and the same plane. The axis and its bearings are shown within. Fig. 3 is a central longitudinal section of the same.

A is that section of the elbow which rests on the pipe-flange of the stove, where it is secured by means of the lugs *a a* or otherwise. B is the reversible section over which the connecting-pipe, at the desired inclination, may fit. The plane of intersection C, between the two sections of the elbow, as shown herein, is at an angle of forty-five degrees to each. This angle may of course be varied according to the conditions under which it may be desired to use the elbow, though generally it will be desired to place it at an angle of forty-five degrees, so that the elbow may be adjusted, at pleasure, to a horizontal or to a vertical connecting-pipe. I I' are straps crossing the center of the sections, flush with their surfaces of contact, as bearings for the axis J, consisting of a bolt or rivet, which passes through the exact center of the straps at right angles to them, and hence to the plane of intersection. These straps need not be entirely flush with the surfaces of contact, but as an equivalent thereto they may be set back, and the space between them filled with a shoulder or washer around the axis, the object being to hold the sections tight and firmly together, without producing too much friction between their surfaces of contact.

We do not claim, broadly, a reversible pipe-elbow whose sections turn on a pivot; but

We claim—

A reversible pipe-elbow of the special construction described, consisting of the two sections secured together and turning upon a pivot or bolt passing through the middle of the straps which bisect those ends of the sections which are in contact.

A. E. CHAMBERLAIN.
J. B. CROWLEY.

Attest:
WM. G. HOSEA,
W. AUSTIN GOODMAN.